United States Patent [19]

Herbrechtsmeier et al.

[11] Patent Number: 5,362,767

[45] Date of Patent: Nov. 8, 1994

[54] COPOLYMERS COMPRISING PROPELLANES AND CONTACT LENSES MADE THEREFROM

[75] Inventors: Peter Herbrechtsmeier, Königstein; Horst Schäfer, Aschaffenburg; Bernhard Seiferling, Goldbach; Arnulf-Dieter Schlüter, Berlin; Harald Bothe, Wiesbaden; Rainer Freudenberger, Mühlheim, all of Germany

[73] Assignee: Ciba-Geigy Corporation, Ardsley, N.Y.

[21] Appl. No.: 961,105

[22] Filed: Oct. 14, 1992

[30] Foreign Application Priority Data

Oct. 14, 1991 [CH] Switzerland .......................... 3003/91

[51] Int. Cl.$^5$ ...................... C08F 210/00; G02B 1/04; C08G 61/06
[52] U.S. Cl. ..................... 523/106; 523/107; 523/108; 524/553; 524/846; 526/282; 351/160 R
[58] Field of Search ...................... 523/106, 107, 108; 524/553, 846; 526/282; 351/160 R

[56] References Cited

FOREIGN PATENT DOCUMENTS 8912085 12/1989 WIPO .................................. 526/282

OTHER PUBLICATIONS

Schluter et al., *Makromoleculare Chemie*, 192, (1991), pp. 2497–2519.

*Primary Examiner*—Paul R. Michl
*Assistant Examiner*—Andrew E. C. Merriam
*Attorney, Agent, or Firm*—Edward McC. Roberts; R. Scott Meece

[57] ABSTRACT

The invention relates to contact lenses made from a copolymer comprising units of formula I

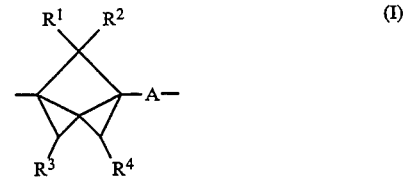

wherein $R^1$ and $R^2$ are each independently of the other hydrogen, alkyl, alkoxyalkyl, organosilylalkyl or organosilyl, $R^3$ and $R^4$ are each hydrogen or, taken together, are a divalent alkylene radical containing up to 8 carbon atoms, and A is a divalent substituted 1,2-ethylene radical which is derived from a copolymerisable vinyl monomer by virtue of the vinyl double bond being replaced with a single bond. The invention further relates to the copolymers themselves, to the use thereof for making contact lenses, and to a process for making contact lenses from such copolymers.

9 Claims, No Drawings

COPOLYMERS COMPRISING PROPELLANES AND CONTACT LENSES MADE THEREFROM

The present invention relates to copolymers based on propellanes, to their preparation, to contact lenses consisting partially or essentially of such copolymers, to a process for making said contact lenses, and to the use of said copolymers for making contact lenses or other objects.

The contact lenses of this invention, as well as the copolymers from which they are made, are distinguished by superior hardness or water absorption, depending on the choice of comonomers. At all events they have excellent oxygen permeability.

These advantages are achieved by preparing the copolymers from monomers which contain a tricyclic ring system. This ring system consists of (1.1.1)propellanes. In addition to the propellanes, one or more than one copolymerisable vinyl monomer is used, typically siloxane monovinyl components, siloxane oligovinyl components, hydrophobic vinyl components such as fluorine-containing vinyl compounds or vinyl compounds having a bulky hydrocarbon radical, or hydrophilic vinyl components.

The copolymerisable vinyl monomers are preferably acrylates or methacrylates. Which of them are copolymerised with the propellanes will depend largely on the desired properties of the resultant copolymers and contact lenses. Thus vinyl monomers having bulky hydrocarbon radicals lead to superior hardness and, in swellable systems, to superior stiffness. Owing to the presence of bulky groups, such products are substantially amorphous. This property is especially useful for high transparency and oxygen permeability. A further enhancement of permeability can be achieved by using siloxane-containing vinyl components or fluorine-containing vinyl components. In contrast, the use of hydrophilic vinyl components as comonomers results in copolymers or contact lenses with good wetting properties being obtained. Given a higher concentration of hydrophilic comonomers, the products may become water-soluble, depending on the concentration. In such a case, however, swellable copolymers or contact lenses are obtained by crosslinking. Propellanes can be copolymerised with vinyl monomers to form in particular 1:1 adducts in which the units that are formed from propellane and the units that are formed from vinyl monomer alternate. A number of such copolymers are already known. Thus, for example, a copolymer with acrylonitrile has been described by K. Opitz and A. -D. Schlüter, Angew. Chemie 101,513 (1989), and a copolymer with maleic anhydride has been described by J. -M. Gosau and A. -D. Schlüter. Chem. Bet. 123 (1990) 2449. No technical utilities have so far been described for the cited copolymers.

An essential feature of this invention is that the copolymers some of which are already known can be used for making contact lenses. A first embodiment of the invention therefore relates to a contact lens made from a copolymer comprising units of formula I

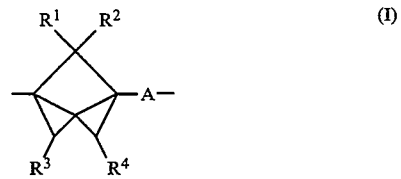

wherein $R^1$ and $R^2$ are each independently of the other hydrogen, alkyl, alkoxyalkyl, organosilylalkyl or organosilyl, $R^3$ and $R^4$ are each hydrogen or, taken together, are a divalent alkylene radical containing up to 8 carbon atoms, and A is a divalent substituted 1,2-ethylene radical which is derived from a copolymerisable vinyl monomer by virtue of the vinyl double bond being replaced with a single bond.

Within the scope of this invention, the general terms employed above are in particular defined as follows:

Radicals and groups qualified by the term "lower", e.g. lower alkyl, lower alkoxy etc., will be taken to mean radicals and groups containing up to 7, preferably up to 4, carbon atoms.

Alkyl is preferably alkyl of up to 15 carbon atoms, more particularly lower alkyl, and is typically methyl, ethyl, propyl, butyl, tert-butyl, pentyl, octyl or decyl.

Alkoxy is preferably lower alkoxy and is typically methoxy, ethoxy, propoxy, butoxy or tert-butoxy. Alkoxyalkyl is preferably lower alkoxy-lower alkyl containing a total of up to 14, preferably of up to 10, carbon atoms. Typical examples are methoxyethyl, ethoxyethyl, ethoxybutyl and propoxybutyl.

Organosilylalkyl is preferably lower alkyl which is substituted by one or more than one tri-lower alkylsilyl group, e.g. trimethylsilyl, or by phenyl-di-lower alkylsilyl, e.g. phenyldimethylsilyl. Typical examples are trimethylsilylmethyl, trimethylsilylethyl, trimethylsilylbutyl, triethylsilylethyl, tert-butyldimethylsilylethyl, tert-butyldimethylsilylmethyl or phenyldimethylsilylmethyl.

Organosilyl is preferably silicon which is substituted by one or more of tri-lower alkyl, e.g. trimethyl, or phenyl-di-lower alkyl, e.g. phenyldimethyl. Typical examples are trimethylsilyl, triethylsilyl, tert-butyldimethylsilyl or phenyldimethylsilyl.

$R^3$ together with $R^4$ as a divalent alkylene radical containing up to 8 carbon atoms is preferably a lower alkylene radical which separates the two atoms to which $R^3$ and $R^4$ are attached by 2 to 5, preferably by 3 or 4, carbon atoms. Typical examples are 1,3-propylene, 1,3-butylene, 1,4-butylene, 3-methyl-1,5-pentylene, or 1,5-pentylene.

The starting monomers for providing the bicyclic component of formula I to obtain the inventive copolymers or contact lenses are compounds of formula II,

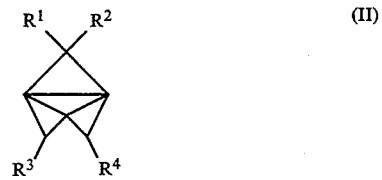

wherein $R^1$, $R^2$, $R^3$ and $R^4$ are as defined for formula I. The compounds, so-called (1.1.1)propellanes are known per se and can be prepared in a manner which is known per se.

Preferred compounds of formula II used in the practice of this invention are those in which $R^1$ and $R^2$ are each independently of the other hydrogen, lower alkyl or lower alkoxy-lower alkyl, and $R^3$ and $R^4$ are each hydrogen or, taken together, are a divalent lower alkylene radical.

Especially preferred compounds of formula II used in the practice of this invention are those wherein $R^1$ and $R^2$ are each independently of the other hydrogen or lower alkyl, and $R^3$ and $R^4$ are each hydrogen or, taken together, are a divalent lower alkylene radical which separates the two atoms to which $R^3$ and $R^4$ are attached by 2 to 5, preferably by 3 or 4, carbon atoms.

The most preferred compounds of formula II used in the practice of this invention are those in which $R^1$ is hydrogen, $R^2$ is hydrogen or lower alkyl, and $R^3$ and $R^4$ are each hydrogen or, taken together, are a divalent lower alkylene radical which separates the two atoms to which $R^3$ and $R^4$ are attached by 3 or 4 carbon atoms.

The aforementioned preferences with respect to compounds of formula II also apply by analogy to copolymers of formula I and to the novel contact lenses which contain the copolymers of formula I.

A copolymerisable vinyl monomer will be understood within the scope of this invention as meaning preferably a monomer which contains a vinyl group and has been mentioned already in connection with copolymers which have found utility for contact lenses. A vinyl group will be understood in this context as not meaning exclusively the vinyl grouping "—CH=CH$_2$", but quite generally any grouping that contains a carbon-carbon double bond. Particularly preferred meanings of the "vinyl" moiety of vinyl monomers will become evident from the following definitions in connection with the compounds of formula III. Copolymerisable vinyl monomers within the context of this invention have already been disclosed in, inter alia, EP-A-374 752, EP-A-417 235 and in EP-A-455 587.

The starting monomers for providing component A of formula I for obtaining the inventive copolymers or contact lenses are compounds of formula III

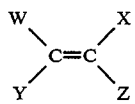  (III)

which, symbolised by the letter A, are built into the copolymer of formula I in the form of the partial formula IV

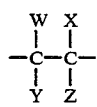  (IV)

wherein the substituents W, X, Y and Z have the following meanings: three of these substituents are hydrogen and the fourth is selected from among acyl, halogen, a heterocyclic radical or aryl, or two of these substituents are hydrogen, the third is lower alkyl, and the fourth is selected from among acyl, halogen, a heterocyclic radical or aryl, or two of these substituents are hydrogen anti the other two together form a hydrocarbon bridge which is not interrupted or is interrupted by one or two hetero atoms, or the other two substituents are each independently acyl. The monomers of formula III are either hydrophilic vinyl monomers or hydrophobic vinyl monomers.

Aryl denotes preferably an aromatic hydrocarbon radical of 6 to 15 carbon atoms such as phenyl or phenyl which is substituted by one or more than one, preferably by up to three, the same or different members selected from the group consisting of lower alkyl, lower alkoxy, halogen, amino and hydroxy. Typical examples are phenyl or tolyl.

Halogen is preferably chloro, bromo or fluoro, but may also be iodo.

A heterocyclic radical is preferably a 5- or 6-membered aromatic or saturated ring containing one or two hetero atoms such as oxygen or nitrogen atoms, preferably one or two nitrogen atoms. Lactams are also encompassed.

A hydrocarbon bridge which is not interrupted or interrupted in the carbon chain by one or two hetero atoms is preferably lower alkylene or lower alkylene which is interrupted by oxygen or nitrogen. Lower alkylene interrupted by nitrogen may also be substituted, conveniently by lower alkyl. Exemplary of such lower alkylene groups are 1,3-propylene, 2-aza-1,3-propylene or N-methyl-2-aza-1,3-propylene.

Acyl is typically carboxy, aroyl, cycloalkanoyl or alkanoyl and is preferably carboxy, unsubstituted or substituted aryloxycarbonyl, unsubstituted or substituted cycloalkoxycarbonyl or unsubstituted or substituted alkoxycarbonyl.

Aroyl is typically benzoyl or benzoyl which is substituted by one or more than one, preferably by up to three, of the same or different members selected from the group consisting of lower alkyl, lower alkoxy, halogen or hydroxy, but may also be phenylsulfonyl or phenoxysulfonyl, as well as phenylsulfonyl or phenoxysulfonyl which are each substituted by lower alkyl, lower alkoxy, halogen or hydroxy.

Alkanoyl is preferably lower alkanoyl and is typically acetyl, propanoyl or butanoyl.

Cycloalkanoyl is preferably cycloalkoxycarbonyl containing up to 8 carbon atoms and is typically cyclohexyloxycarbonyl.

Unsubstituted alkoxycarbonyl is is preferably lower alkoxycarbonyl and is typically methoxycarbonyl, ethoxycarbonyl, propoxycarbonyl, butoxycarbonyl, tert-butoxycarbonyl, tert-butylmethoxycarbonyl or 2-ethylhexyloxycarbonyl.

Unsubstituted aryloxycarbonyl is preferably phenoxycarbonyl.

Substituted aryloxycarbonyl is preferably phenoxycarbonyl which is substituted by one or more than one, preferably by up to three, of the same or different members selected from the group consisting of lower alkyl, lower alkoxy, halogen and hydroxy.

Substituted alkoxycarbonyl is preferably substituted by hydrophobic groups such as halogen, typically fluoro, siloxane groups, or by hydrophilic groups such as hydroxy, amino, mono- or di-lower alkylamino. Further meanings of substituted alkoxycarbonyl, as also of substituted aryloxycarbonyl and substituted cycloalkoxycarbonyl, may be implied from the description given below of the particularly suitable vinyl monomers of formula III.

The hydrophilic vinyl monomers which may suitably be used in the practice of this invention are:

preferably acrylates and methacrylates of formula III, wherein W and Y are hydrogen, X is hydrogen or methyl, and Z is a group —$Z^1$—$Z^2$, wherein $Z^1$ is —COO— which is bound through oxygen to $Z^2$, and $Z^2$ is a hydrocarbon radical of 1 to 10 carbon atoms which is substituted by one or more than one of a water-solubilising group such as carboxy, hydroxy or tert-amino, e.g. left-lower alkylamino containing 1 to 7 carbon atoms in each lower alkyl moiety, a polyethylene oxide group containing 2-100, preferably 2-40, repeating units, or a sulfate, phosphate, sulfonate or phosphonate group, conveniently a suitably substituted alkyl, cycloalkyl or phenyl radical or a combination of such radicals, typically phenylalkyl or alkylcycloalkyl;

also acrylamides and methacrylamides of formula III, wherein W and Y are hydrogen, X is hydrogen or methyl, and Z is aminocarbonyl or di-lower alkylaminocarbonyl;

acrylamides and methacrylamides of formula III, wherein W and Y are hydrogen, X is hydrogen or methyl and Z is monosubstituted aminocarbonyl which is substituted by a group $Z^2$ as defined above or lower alkyl;

maleates and fumarates of formula III, wherein W and X (or W and Z) are hydrogen, and Y and Z (or X and Y) are each independently of the other a group —$Z^1$—$Z^2$, wherein $Z^1$ and $Z^2$ are as defined above;

crotonates of formula III, wherein W and X are hydrogen, Y is methyl and Z is a group —$Z^1$—$Z^2$, wherein $Z^1$ and $Z^2$ are as defined above;

vinyl ethers of formula III, wherein W, X and Y are hydrogen and Z is a group —$Z^1$—$Z^2$, wherein $Z^1$ is oxygen and $Z^2$ is as defined above;

vinyl-substituted 5- or 6-membered heterocycles containing one or two nitrogen atoms as well as N-vinyl lactams, such as N-vinyl-2-pyrrolidone, of formula III, wherein W, X and Y are hydrogen and Z is a 5- or 6-membered heterocyclic radical containing one or two nitrogen atoms, as well as the radical of a lactam which is bound through nitrogen, e.g. the radical of 2-pyrrolidone;

and vinylic unsaturated carboxylic acids of formula III containing altogether 3 to 10 carbon atoms, typically methacrylic acid, crotonic acid, fumaric acid or cinnamic acid.

Preferred hydrophilic vinyl monomers are hydroxy-substituted $C_2$-$C_4$alkyl(meth)acrylates, 5- to 6-membered N-vinyl lactams, N,N-di-$C_1$-$C_4$alkyl(meth)acrylamides and vinylic unsaturated carboxylic acids containing altogether 3 to 5 carbon atoms.

Water-soluble monomers which may suitably be used in the practice of this invention include: 2-hydroxyethyl acrylates and methacrylates, 2- and 3-hydroxypropyl acrylates and methacrylates, 2,3-dihydroxypropyl acrylates and methacrylates, polyethoxyethyl acrylates and methacrylates, and polyethoxypropyl acrylates and methacrylates, as well as the corresponding acrylamides and methacrylamides, acrylamide and methacrylamide, N-methyl(meth)acrylamide, bis(acetone) acrylamide, 2-hydroxyethyl acrylamide, dimethyl(meth)acrylamide and methylol (meth)acrylamide, N,N-dimethylamino and N,N-diethylamino (meth)acrylates as well as the corresponding acrylamides and methacrylamides, N-tert-butylaminoethyl methacrylate and methacrylamide, 2- and 4-vinylpyridine, 4- and 2-methyl-5-vinylpyridine, N-methyl-4-vinylpiperidine, 1-vinyl and 2-methyl-1-vinylimidazole, dimethyl allylamine and methyl diallylamine and also para-, meta- and ortho-aminostyrene, dimethylaminoethyl vinyl ether, N-vinylpyrrolidone and 2-pyrrolidinoethyl methacrylate, acrylic and methacrylic acid, itaconic acid, cinnamic acid, crotonic acid, fumaric acid, maleic acid, and the hydroxy-lower alkyl mono- and diesters thereof, including 2-hydroxyethyl- and bis(2-hydroxy)ethyl fumarate, maleate and itaconate, as well as 3-hydroxypropylbutyl fumarate and bis(polyalkoxyalkyl) fumarate, maleate and itaconate, maleic anhydride, N-methylmaleimide, sodium acrylate and methacrylate, 2-methacryloyloxyethylsulfonic acid, 2-acrylamido-2-methylpropanesulfonic acid, 2-phosphatoethylmethacrylate, vinylsulfonic acid, phenylvinylsulfonate, sodium vinylsulfonate, p-styrenesulfonic acid, sodium p-styrenesulfonate and allylsulfonic acid, N-vinylpyrrolidone, N-vinylpyridone, N-vinylcaprolactam, and also the quaternised derivatives of cationic monomers which are obtained by quaternisation with selected alkylating agents, typically halogenated hydrocarbons such as methyl iodide, benzyl chloride or hexadecyl chloride, epoxides such as glycidol, epichlorohydrin or ethylene oxide, acrylic acid, dimethyl sulfate, methyl sulfate and propane sultone.

A more complete list of of water-soluble monomers which are eligible for use in this invention will be found in: R. H. Yocum and E. B. Nyquist, Functional Monomers, Vol. 1, pages 424–440 (M. Dekker, N.Y. 1973).

Preferred hydrophilic vinyl monomers are 2-hydroxyethyl methacrylate, N-vinyl-2-pyrrolidone, N,N-dimethyl acrylamide and acrylic and methacrylic acid.

Hydrophobic vinyl monomers which may suitably be used in the practice of this invention are typically:

acrylates and methacrylates of formula III, wherein W and Y are hydrogen, X is hydrogen or methyl and Z is a group —$Z^1$—$Z^3$, wherein $Z^1$ is —COO— which is bound through oxygen to $Z^3$, and $Z^3$ is a linear or branched aliphatic, a cycloaliphatic or an aromatic group of 1 to 21 carbon atoms, typically a suitably substituted alkyl, cycloalkyl or phenyl radical or a combination of such radicals, for example phenylalkyl or alkylcycloalkyl which may contain ether or thioether bonds, sulfoxide or sulfone groups or a carbonyl group; or $Z^3$ is a heterocyclic group which contains oxygen, sulfur or nitrogen atoms and 5 or 6 or, if said group is bicyclic, up to 10 ring atoms, or a polypropylene oxide or poly-n-butylene oxide group containing 2 to 50 repeating alkoxy units, or $Z^3$ is an alkyl group of 1-12 carbon atoms which contains halogen atoms, preferably fluorine atoms, or $Z^3$ is a siloxane group containing 1 to 6 Si atoms;

acrylamides and methacrylamides of formula III, wherein W and Y are hydrogen, X is hydrogen or methyl, and Z is monosubstituted aminocarbonyl which is substituted by a group $Z^3$ which is as defined above;

maleates and fumarates of formula III, wherein W and X (or W and Z) are hydrogen, and Y and Z (or X and Y) are each independently of the other a group —$Z^1$—$Z^3$, wherein $Z^1$ and $Z^3$ are as defined above;

itaconates of the formula III, wherein W and Y are: hydrogen, X is a group —$Z^1$—$Z^3$, wherein $Z^1$ and $Z^3$ are as defined above, and Z is a group —$CH_2$—$Z^1$—$Z^3$, wherein $Z^1$ and $Z^3$ are as defined above;

crotonates of formula III, wherein W and X are hydrogen, Y is methyl and Z is a group —$Z^1$—$Z^3$, wherein $Z^1$ and $Z^3$ are as defined above;

vinyl esters of formula III, wherein W, Y, and X are hydrogen and Z is a group —$Z^1$—$Z^3$, wherein $Z^1$ is —COO— which is bound through carbon to $Z^3$ and $Z^3$ is as defined above;

vinyl ethers of formula III, wherein W, X and Y are hydrogen and Z is a group —$Z^1$-$Z^3$, wherein $Z^1$ is oxygen and $Z^3$ is as defined above;

Particularly preferred hydrophobic vinyl monomers are $C_1$-$C_4$alkyl esters or $C_5$-$C_7$-cycloalkyl esters of vinylic unsaturated carboxylic acids of 3 to 5 carbon atoms.

Illustrative examples of suitable hydrophobic monomers are: methyl, ethyl, propyl, isopropyl, butyl, isobutyl, tert-butyl, ethoxyethyl, methoxyethyl, benzyl, phenyl, cyclohexyl, trimethylcyclohexyl, isobornyl, dicyclopentadienyl, norbornylmethyl, cyclododecyl, 1,1,3,3-tetramethylbutyl, n-butyl, n-octyl, 2-ethylhexyl, decyl, dodecyl, tridecyl, octadecyl, glycidyl, ethylthioethyl, furfuryl, tri-, tetra- and pentasiloxanyl propylacrylates and methacrylates, as well as the corresponding amides; N-( 1,1-dimethyl-3-oxobutyl)acrylamide; mono- and dimethyl fumarate, maleate and itaconate; diethylfumarate; isopropyl and diisopropyl fumarate and itaconate; mono- and diphenyl and methylphenyl fumarate and itaconate; methyl and ethyl crotonate; methyl vinyl ether and methoxyethyl vinyl ether; vinyl acetate, vinyl propionate, vinyl benzoate, acrylonitrile, vinylidene chloride, styrene, α-methyl styrone and tert-butyl styrone.

Preferred hydrophobic vinyl monomers are methyl methacrylate, n-butyl methacrylate, isopropyl methacrylate, isobutyl methacrylate, cyclohexyl methacrylate or a mixture thereof.

Among the vinyl monomers cited above, three special types of hydrophobic vinyl monomers merit particular mention within the context of this invention, namely siloxane monovinyl components, fluorine-containing vinyl compounds and vinyl compounds containing a bulky hydrocarbon radical.

Particularly preferred siloxane monovinyl components are compounds of formula III, wherein W and Y are hydrogen, X is hydrogen or methyl and Z is a group —$Z^1$—$Z^4$, wherein $Z^1$ is —COO— which is bound through oxygen to $Z^4$ and wherein $Z^4$ is silyl-lower alkyl which is substituted by one or more than one, e.g. by three to nine, tri-lower alkylsilyloxy groups. Silyl-lower alkyl will be taken in this context to mean a lower alkyl radical which is substituted by one or more than one silicon atom, the free valences of which radical are saturated at the silicon atoms preferably by tri-lower alkylsilyloxy. Individual compounds to be singled out for special mention include tris(trimethylsiloxy)silylpropyl methacrylate and tris(tris(trimethylsiloxy)siloxy)silylpropyl methacrylate.

Especially preferred fluorine-containing vinyl compounds are compounds of formula III, wherein W and Y are hydrogen, X is hydrogen or methyl, and Z is a group —$Z^1$—$Z^5$, wherein $Z^1$ is —COO— which is bound through oxygen to $Z^5$ and wherein $Z^5$ is fluorine-substituted alkyl, preferably lower alkyl. Specific examples of such compounds are 2,2,2-trifluoroethyl methacrylate, 2,2,3,3-tetrafluoropropyl methacrylate, 2,2,3,3,4,4,5,5-actafluoropentyl methacrylate and hexafluoroisopropyl methacrylate.

Especially preferred vinyl con, pounds having a bulky hydrocarbon radical are compounds of formula III, wherein W and Y are hydrogen, X is hydrogen or methyl, and Z is a a group —$Z^1$—$Z^6$, wherein $Z^1$ is —COO— which is bound through oxygen to $Z^6$ and wherein $Z^6$ is lower alkyl-substituted cycloalkyl, lower alkyl-substituted cycloalkyl-lower alkyl, unsubstituted or lower alkyl-substituted dicycloalkyl or oligocycloalkyl, unsubstituted or lower alkyl-substituted dicycloalkyl-lower alkyl or oligocycloalkyl-lower alkyl, or $C_5$-$C_{10}$alkyl which contains at least one tert-butyl group and which is unsubstituted or substituted by cycloalkyl.

Lower alkyl-substituted cycloalkyl $Z^6$ is typically suitably substituted $C_5$-$C_7$cycloalkyl such as cyclopentyl, cyclohexyl or cycloheptyl, each substituted by one to five lower alkyl groups. Preferred substituents are $C_1$-$C_4$alkyl groups, preferably methyl. Cycloalkyl $Z^6$ is preferably substituted in 3-position by at least one, preferably by more than one, lower alkyl group. Cyclohexyl which is substituted by one to four lower alkyl groups, e.g. methyl groups, is pre-eminently suitable, typically 3,5-dimethylcyclohexyl, 3,3,5-trimethylcyclohexyl or 3,3,5,5-tetramethylcyclohexyl.

Lower alkyl-substituted cycloalkyl-lower alkyl $Z^6$ signifies radicals as previously defined which are bound through lower alkyl, preferably methyl, i.e. typically trimethylcyclohexylmethyl such as 3,3,5-trimethylcyclohexylmethyl.

By unsubstituted or lower alkyl-substituted dicycloalkyl or oligocycloalkyl $Z^6$ will be understood unsubstituted or lower alkyl-substituted di-, tri- or tetracyclic hydrocarbon radicals. These radicals contain preferably five or six ring members in each ring. The sum of the ring members is preferably 7 to 12 carbon atoms. Exemplary of preferred radicals $Z^6$ are bicyclo(2.2.1)heptyl, bicyclo(2.2.2)octyl, tricyclo(5.2.1.0$^{2,6}$)decyl, adamantyl, bornyl or isobornyl.

Unsubstituted or lower alkyl-substituted dicycloalkyl-lower alkyl or oligocycloalkyl-lower alkyl $Z^6$ signifies radicals as previously defined which are bound through lower alkyl, preferably through methyl, i.e. typically tricyclo(5.2.1.0$^{2,6}$)decylmethyl or adamantylmethyl.

$C_5$-$C_{10}$Alkyl which contains at least one tert-butyl group and which is unsubstituted or substituted by cycloalkyl denotes preferably tert-butyl-$C_1$-$C_6$alkyl such as tert-butylmethyl, 2-tert-butylethyl or 2-tert-butyl-2-cyclohexylethyl.

Individual compounds which merit special mention are 3,3,5-trimethylcyclohexyl methacrylate, isobonyl methacrylate, neopentyl methacrylate and tricyclo(5.2.1.0)decyl methacrylate.

The copolymers comprising units of formula I and contact lenses made therefrom may also contain oligovinyl comonomers as crosslinking agents.

Particularly suitable crosslinking agents are diolefinic monomers such as allyl (meth)acrylate, ethylene glycol di(meth)acrylates diethylene glycol di(meth)acrylates, triethylene glycol di(meth)acrylates, tetraethylene glycol di(meth)acrylates and, quite generally, polyethylene oxide glycol di(meth)acrylates, 1,4-butanediol di(meth)acrylatcs, and polyn-butylene oxide glycol di(meth)acrylates, propylene glycol di(meth)acrylates and polypropylene oxide glycol di(meth)acrylates, thiodiethylene glycol di(meth)acrylate, bis(2-hydroxyethyl)sulfone di(meth)acrylate, neopentyl glycol di(meth)acrylate, trimethylolpropane tri- and tetraacrylate, pentaerythritol tri- and -tetraacrylate, divinyl benzene, divinyl ether, divinyl sulfone, disiloxanyl-bis(3-hydroxypropyl) di(meth)acrylate, and related compounds. Ethylene glycol dimethacrylate is preferred. Suitable crosslinking agents are also oligovinyl macromers, typically the divinyl macromers disclosed in U.S. Pat. No. 4,136,250. Also useful in the practice of this invention are oligovinyl siloxanes, for example bis(meth)acryloxy-lower alkyl siloxanes containing up to 10 silicon atoms. Exemplary thereof are 3,5-bis(3-methacroyloxypropyl)-3,5-bis(trimethylsiloxy)-1,1,1,7,7,7-hexamethyltetrasiloxane and 1,3-dimethacryloxypropyltetramethyl disiloxane.

The aforementioned preferences with respect to compounds of Formula III and also for crosslinking agents also apply by analogy to copolymers of formula I and the inventive contact lenses which contain copolymers of formula I.

The compounds of formula III are also known or can be prepared in a manner known per se.

In addition to the contact lenses made from a copolymer comprising units of formula I, the invention also relates to those copolymers of formula I from which they are made, provided said copolymers are novel. These novel copolymers are the copolymers of formula I except the 1:1 copolymers of tetracyclo(5.1.0.0$^{1,6}$.0$^{2,7}$)octane (compound of formula II, wherein $R^1$ and $R^2$ are hydrogen and $R^3$ and $R^4$, taken together, are 1,3-propylene), and acrylonitrile, tricyclo(1.1.1.0$^{1,3}$)pentane and acrylonitrile, 2-pentyltricyclo(1.1.1.0$^{1,3}$)pentane and acrylonitrile, as well as tricyclo(1.1.1.0$^{1,3}$)pentane and maleic anhydride.

The copolymers are usually alternating copolymers in which both components shown in formula I ("A" and the propellane) are regularly repeating, without said components being separated from each other by other components. Also encompassed, however, are ternary and quaternary copolymers as well as contact lenses made therefrom which are obtainable from e.g. two different compounds of formula II and a compound of formula III, or from a compound of formula II and two different compounds of formula III. Such copolymers can themselves have alternating structures, typically alternating blocks of propellane and first comonomer as well as from propellane and second comonomer or also from first and second comonomer, or structures deviating therefrom, for example irregular structures or triple sequences of propellane, first and second comonomer.

The inventive comonomers are prepared in a manner known per se. Thus the monomers of formulae II and III can be polymerised at room temperature in the presence of a suitable solvent. A suitable solvent is typically a hydrocarbon such as hexane, benzene or toluene, or an ether such as diethyl ether or tetrahydrofuran. After stripping off the solvent, there is typically obtained a sheet which can be shaped to a contact lens. The polymerisation can also be accelerated in a manner as described hereinafter.

The novel polymers are produced conveniently by photopolymerisation, thermal polymerisation or by radical copolymerisation, either in bulk or in the presence of minor amounts of solvent. The polymerisation is conveniently carried out at elevated temperature, preferably in the presence of an initiator which generates free radicals, typically in the temperature range from c. 30° C. to c. 105° C. These initiators are preferably peroxides or azo catalysts with a half-life of at last 20 minutes at the polymerisation temperature. Typical examples of useful peroxy compounds are isopropyl percarbonate, tert-butyl peroctoate, benzoyl peroxide, lauroyl peroxide, decanoyl peroxide, acetyl peroxide, succinyl peroxide, methyl ethyl ketone peroxide, tert-butyl peroxyacetate, propionyl peroxide, 2,4-dichlorobenzoyl peroxide, tert-butyl peroxypivalate, pelargonyl peroxide, 2,5-dimethyl-2,5-bis(2-ethylhexanoylperoxy) hexane, p-chlorobenzoyl peroxide, and bis( 1-hydroxycyclohexyl) peroxide.

Azo compounds include 2,2'-azobisisobutyronitrile, 2,2'-azobis(2,4-dimethylvaleronitrile), 1,1'-azobis(cyclohexanecarbonitrile) and 2,2'-azobis(2,4-dimethyl-4-methoxyvaleronitrile).

Further suitable initiators are photoinitiators, benzoin ethers, Darocure types (Merck) or Irgacure types (Ciba-Geigy).

It is also possible to use other mechanisms which generate free radicals, typically irradiation with e.g. X-rays, electron beams and UV radiation.

The amount of initiator may vary from 0.01 to 1.5% by weight, based on the components of formula II and III, but is preferably from 0.01 to 0.5 % by weight.

The polymerisation mixtures can be polymerised in a manner which is known per se, typically in cylinder form, conveniently by subjecting them in closed cylindrical moulds (pipes) to a temperature program at which the temperature is raised stepwise from 30° to c. 100° C. The temperature steps can be from 5° to 10° C., with a residence time of 1 to 12 hours per temperature. Two- or five-hour intervals are usual, but individual temperatures can also be kept for up to 20 hours. Normally tempering is carried out at the conclusion for 1 to 15 hours in the temperature range from 80° to 130° C.

The contact lenses of this invention can also be made in a manner which is known per se. This is done e.g. by polymerising the compounds of formulae II and III in a cylindrical mould and the rods so obtained are cut after removal from the mould to discs or buttons which can be further processed mechanically, preferably by lathing methods. In addition, the inventive contact lenses can also be made by other known methods such as casting in static moulds, spin-casting, compression moulding, deep-drawing, thermoforming, lathing or laser processing. These methods are known per se and those skilled in the art will require no further detailed explanation.

Preparation of the contact lens is preferably carried out in an inert gas atmosphere if open moulds are used. It is common knowledge that oxygen inhibits the polymerisation and results in prolonged polymerisation times. If closed moulds are used for fondling the polymer, then the moulds are conveniently made of inert materials with low oxygen permeability and tack-free properties. Exemplary of suitable mould materials are polytetrafluoroethylene such as Teflon ®, silicone rubber, polyethylene, polypropylene and polyesters such as Mylar ®. If a suitable mould release agent is used, moulds made of glass and metal are also useful.

Casting in static moulds can result directly in the formation of contact lenses if moulds with front curves and base curves are used. Thus contact lenses can be made by polymerising the compounds of formulae II and III in suitable moulds directly by a full mould process or by a semi-mould process.

Spin-casting can also be used in the practice of this invention by charging a solution of the compounds of formulae II and III to a mould for spin-casting and the mould is then rotated, whereupon the solvent evaporates. The finished contact lens, whose dimensions can be controlled by the size of the mould, the speed of rotation and the viscosity of the solution, remains in the mould.

Compression moulding is carried out typically by compressing a sheet of the inventive copolymer. A sheet from the copolymer can be made in a manner known per se by casting a solution of the compounds of formulae II and III.

A contact lens can also be made from a sheet preferably as described above by deep-drawing or thermoforming.

The final process step for making the contact lens of this invention is typically lathing, especially whenever a blank obtainable by one of the above processes requires further forming. By lathing is meant the known machining of contact lens blanks. Suitable blanks may be made by extruding rods and cutting or casting them from a solution. Contact lens blanks will be understood in this context as meaning buttons or semi-mould products such as base curve blanks. Typical blanks are 4 to 6 mm thick and have a diameter of 10 to 17 mm, typically of 12 or 14 mm.

Laser processing can also be employed in the practice of this invention, starting from blanks or from contact lenses made by one of the other methods, provided said lenses require an additional refining of their surface.

The following Examples illustrate the invention in more detail, but imply no restriction to what is described therein. Unless otherwise expressly indicated, pans and percentages are by weight. Temperatures are given in degrees Centigrade.

EXAMPLE 1

100 mmol of tricyclo(1.1.1.0$^{1,3}$)pentane and 150 mmol of N-methylmaleimide are copolymerised in diethyl ether for two days at room temperature, excluding oxygen. The viscous solution is poured on to a glass plate and the solvent is allowed to evaporate. An alternating copolymer in the form of a sheet is obtained in 75 % yield; decomposition temperature >250° C.

EXAMPLE 2

100 mmol of tricyclo(1.1.1.0$^{1,3}$)pentane and 150 mmol of methyl acrylate are copolymerised for two days in 30% solution of benzene at room temperature, excluding oxygen. The viscous solution is poured on to a glass plate and the solvent is allowed to evaporate. An alternating copolymer in the form of a sheet is obtained in 99% yield; glass transition temperature 53° C.

EXAMPLE 3

100 mmol of tricyclo(1.1.1.0$^{1,3}$)pentane and 150 mmol of methyl methacrylate are copolymerised for two days in diethyl ether at room temperature, excluding oxygen. The viscous solution is poured on to a glass plate and the solvent is allowed to evaporate. An alternating copolymer in the form of a sheet is obtained in 56% yield; glass transition temperature 115° C.

EXAMPLE 4

100 mmol of tricyclo(1.1.1.0$^{1,3}$)pentane and 150 mmol of phenyl vinyl sulfonate are copolymerised for two days in diethyl ether at room temperature, excluding oxygen. The viscous solution is poured on to a glass plate and the solvent is allowed to evaporate. An alternating copolymer in the form of a sheet is obtained in 15% yield; glass transition temperature 60° C.

EXAMPLE 5

100 mmol of tricyclo(1.1.1.0$^{1,3}$)pentane and 150 mmol of styrene are copolymerised for two days in 30% solution of benzene at room temperature, excluding oxygen. The viscous solution is poured on to a glass plate and the solvent is allowed to evaporate. An alternating copolymer in the form of a sheet is obtained in 15% yield; glass transition temperature 161° C.

EXAMPLE 6

100 mmol of 2-pentyltricyclo(1.1.1.0$^{1,3}$)pentane and 150 mmol of dimethyl maleate are copolymerised for two days in diethyl other at room temperature, excluding oxygen. The viscous solution is poured on to a glass plate and the solvent is allowed to evaporate. An alternating copolymer in the form of a sheet is obtained in 32% yield; decomposition temperature >250° C.

EXAMPLE 7

100 mmol of 2-pentyltricyclo(1.1.1.0$^{1,3}$)pentane and 150 mmol of phenyl vinyl sulfonate are copolymeriscd for two days in diethyl other at room temperature, excluding oxygen. The viscous solution is poured on to a glass plate and the solvent is allowed to evaporate. An alternating copolymer in the form of a sheet is obtained in 20% yield; glass transition temperature 21 ° C.

EXAMPLE 8

100 mmol of 2-pentyltricyclo(1.1.1.0$^{1,3}$)pentane and 150 mmol of vinylidene chloride are copolymerised for two days in diethyl ether at room temperature, excluding oxygen. The viscous solution is poured on to a glass plate and the solvent is allowed to evaporate. An alternating copolymer in the form of a sheet is obtained in 35% yield; glass transition temperature c. 10° C.

EXAMPLE 9

100 mmol of tricyclo(1.1.1.0$^{1,3}$)pentane and 150 mmol of ethyl acrylate are copolymerised as described in the preceding Examples. A sheet with a glass transition temperature of 100° C. is obtained. The sheet is compression moulded to give a contact lens with a DK value of 7 (Dk/L: 9).

EXAMPLE 10

100 mmol of tricyclo(1.1.1.0$^{1,3}$)pentane and 150 mmol of trifluoromethyl methacrylate are copolymeriscd as described in the preceding Examples. A sheet with a glass transition temperature of 40° C. is obtained. The sheet is compression moulded to give a contact lens with a DK value of 10 (Dk/L: 25).

EXAMPLE 11

100 mmol of tricyclo(1.1.1.0$^{1,3}$)pentane and 150 mmol of tris(trimethylsiloxy)silylpropyl methacrylate ,are copolymeriscd as described in the preceding Examples. A sheet with a glass transition temperature of 16° C. is obtained. The sheet is compression moulded to give a contact lens with a DK value of 135 (DK/L: 150). For comparison, the values for polymethacrylacrylate are also given: glass transition temperature 120° C., DK value <1, transmissibility DK/L also <1.

What is claimed is:

1. A contact lens made from a copolymer comprising units of formula I

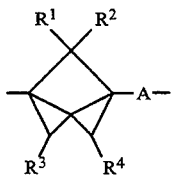

wherein $R^1$ and $R^2$ are each independently of the other hydrogen, alkyl, alkoxyalkyl, organosilylalkyl or organosilyl, $R^3$ and $R^4$ are each hydrogen or, taken together, are a divalent alkylene radical containing up to 8 carbon atoms, and A is a divalent substituted 1,2-ethylene radical which is derived from a copolymerisable vinyl monomer by virtue of the vinyl double bond being replaced with a single bond.

2. A contact lens according to claim 1, wherein $R^1$ and $R^2$ are each independently of the other hydrogen, lower alkyl or lower alkoxy-lower alkyl, and $R^3$ and $g^4$ are each hydrogen or, taken together, are a divalent lower alkylene radical.

3. A contact lens according to claim 1, wherein $R^1$ is hydrogen and $R^2$ is hydrogen or lower alkyl, and $R^3$ and $R^4$ are each hydrogen or, taken together, are a divalent lower alkylene radical which separates the two atoms to which $R^3$ and $R^4$ are attached by 3 or 4 carbon atoms.

4. A contact lens according to claim 1, wherein the copolymer comprising units of formula I is an alternating copolymer.

5. A contact lens according to claim 1, wherein the component of formula I which is designated by the letter A has the partial formula IV

wherein the substituents W, X, Y and Z have the following meanings: three of these substituents are hydrogen and the fourth is acyl, halogen, a heterocyclic radical or aryl, or two of these substituents are hydrogen, the third is lower alkyl, and the fourth is acyl, halogen, a heterocyclic radical or aryl, or two of these substituents are hydrogen and the other two together form a hydrocarbon bridge which is not interrupted or is interrupted by one or two hetero atoms, or the other two substituents are each independently acyl.

6. A contact lens according to claim 1, which is made from a copolymer obtainable from a compound of formula II,

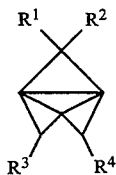

wherein $R^1$, $R^2$, $R^3$ and $R^4$ are as defined for formula I, and a compound of formula III

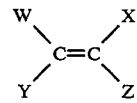

wherein the substituents W, X, Y and Z have the following meanings: three of these substituents are hydrogen and the fourth is acyl, halogen, a heterocyclic radical or aryl, or two of these substituents are hydrogen, the third is lower acyl, and the fourth is acyl, halogen, a heterocyclic radical or aryl, Or two of these substituents are hydrogen and the other two together form a hydrocarbon bridge which is not interrupted or is interrupted by one or two hereto atoms, or the other two substituents are each independently acyl.

7. A contact lens according to claim 6, wherein the compound of formula III is selected from the following compounds: acrylates and methacrylates of formula III, wherein W and Y are hydrogen, X is hydrogen or methyl, and Z is a group $-Z^1-Z^2$, wherein $Z^1$ is $-COO-$ which is bound through oxygen to $Z^2$, and $Z^2$ is a hydrocarbon radical of 1 to 10 carbon atoms which is substituted by one or more than one of a water-solubilising group such as carboxy, hydroxy or tert-amino, e.g. tert-lower alkylamino containing 1 to 7 carbon atoms in each lower alkyl moiety, a polyethylene oxide group containing 2–100, preferably 2–40, repeating units, or a sulfate, phosphate, sulfonate or phosphonate group, conveniently a suitably substituted alkyl, cycloalkyl or phenyl radical or a combination of such radicals, typically phenylalkyl or alkylcycloalkyl;

also acrylamides and methacrylamides of formula III, wherein W and Y are hydrogen, X is hydrogen or methyl, and Z is aminocarbonyl or di-lower alkylaminocarbonyl;

acrylamides and methacrylamides of formula III, wherein W and Y are hydrogen, X is hydrogen or methyl and Z is monosubstituted aminocarbonyl which is substituted by a group $Z^2$ as defined above or lower alkyl;

maleates and fumarates of formula III, wherein W and X (or W and Z) are hydrogen, and Y and Z (or X and Y) are each independently of the other a a group $-Z^1-Z^2$, wherein $Z^1$ and are $Z^2$ as defined above;

crotonates of formula III, wherein W and X are hydrogen, Y is methyl and Z is a group $-Z^1-Z^2$, wherein $Z^1$ and $Z^2$ are as defined above;

vinyl ethers of formula III, wherein W, X and Y are hydrogen and Z is a group $-Z^1-Z^2$, wherein $Z^1$ is oxygen and $Z^2$ is as defined above;

vinyl-substituted 5- or 6-membered heterocycles containing one or two nitrogen atoms as well as N-vinyl lactams such as N-vinyl-2-pyrrolidone, of formula III, wherein W,V, X and Y are hydrogen and Z is a 5- or 6-membered heterocyclic radical containing one or two nitrogen atoms, as well as the radical of a lactam which is bound through nitrogen, e.g. the radical of 2-pyrrolidone;

and vinylic unsaturated carboxylic acids of formula III containing altogether 3 to 10 carbon atoms, typically methacrylic acid, crotonic acid, fumaric acid or cinnamic acid; acrylatcs and methacrylates of formula III, wherein W and Y are hydrogen, X is hydrogen or methyl and Z is a group —$Z^1$—$Z^3$, wherein $Z^1$ is —COO— which is bound through oxygen to $Z^3$, and $Z^3$ is a linear or branched aliphatic, a cycloaliphatic or an aromatic group of 1 to 21 carbon atoms, typically a suitably substituted alkyl, cycloalkyl or phenyl radical or a combination of such radicals, such as phenylalkyl or alkylcycloalkyl which may contain ether or thioether bonds, sulfoxide or sulfone groups or a carbonyl group; or $Z^3$ is a heterocyclic group which contains oxygen, sulfur or nitrogen atoms and 5 or 6 or, if said group is bicyclic, up to 10 ring atoms, or a polypropylene oxide or poly-n-butylene oxide group containing 2 to 50 repeating alkoxy units, or $Z^3$ is an alkyl group of 1-12 carbon atoms which contains halogen atoms, preferably fluorine atoms, or $Z^3$ is a siloxane group containing 1 to 6 Si atoms;

acrylamides and methacrylamides of formula III, wherein W, V and Y are hydrogen, X is hydrogen or methyl, and Z is monosubstituted aminocarbonyl which is substituted by a group $Z^3$ which is as defined above;

maleates and fumarates of formula III, wherein W and X (or W and Z) are hydrogen, and Y and Z (or X and Y) are each independently of the other a group —$Z^1$—$Z^3$, wherein $Z^1$ and $Z^3$, are as defined above;

itaconates of the formula III, wherein W and Y are hydrogen, X is a group —$Z^1$—$Z^3$, wherein $Z^1$ and $Z^3$ are as defined previously, and Z is a group —$CH_2$—$Z^1$—$Z^3$, wherein $Z^1$ and $Z^3$ are as defined above;

crotonates of formula III, wherein W and X are hydrogen, Y is methyl and Z is a group —$Z^1$—$Z^3$, wherein $Z^1$ and $Z^3$ are as defined above:

vinyl esters of formula III, wherein W, Y, and X are hydrogen and Z is a group —$Z^1$—$Z^3$, wherein $Z^1$ is —COO— which is bound through carbon to $Z^3$ and $Z^3$ is as defined above; vinyl ethers of formula III, wherein W, X and Y are hydrogen and Z is a group —$Z^1$—$Z^3$, wherein $Z^1$ is oxygen and $Z^3$ is as defined above.

8. A contact lens according to claim 6, wherein the compound of formula III is a compound which is selected from the group consisting of siloxane monovinyl components, fluorine-containing vinyl compounds and vinyl compounds which contain a bulky hydrocarbon radical.

9. A copolymer comprising units of formula I

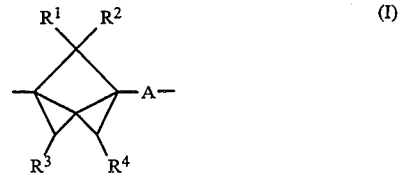

wherein $R^1$ and $R^2$ are each independently of the other hydrogen, alkyl, alkoxyalkyl, organosilylalkyl or organosilyl, $R^3$ and $R^4$ are each hydrogen or, taken together, are a divalent alkylene radical containing tip to 8 carbon atoms, and A is a divalent substituted 1,2-ethylene radical which is derived from a copolymerisable vinyl monomer by virtue of the vinyl double bond being replaced with a single bond,

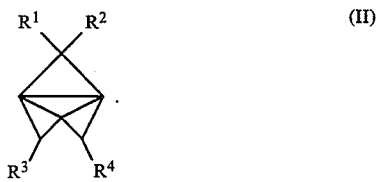

except the 1:1 copolymers of tetracyclo(5.1.0.0$^{1,6}$.0$^{2,7}$)octane (compound of formula II, wherein $R^1$ and $R^2$ are hydrogen and $R^3$ and $R^4$, taken together, are 1,3-propylene), and acrylonitrile, tricyclo(1.1.1.0$^{1,3}$)pentane and acrylonitrile, 2-pentyltricyclo(1.1.1.0$^{1,3}$)pentane and acrylonitrile, as well as tricyclo(1.1.1.0$^{1,3}$)pentane and maleic anhydride.

* * * * *